United States Patent
Hein

(10) Patent No.: US 7,323,858 B2
(45) Date of Patent: Jan. 29, 2008

(54) METHOD FOR MEASURING PRESSURE

(75) Inventor: Dierk Hein, Wedemark (DE)

(73) Assignee: Continental AG, Hanover (DE)

( * ) Notice: Subject to any disclaimer, the term of this patent is extended or adjusted under 35 U.S.C. 154(b) by 0 days.

(21) Appl. No.: 10/563,407

(22) PCT Filed: Apr. 17, 2004

(86) PCT No.: PCT/EP2004/004111

§ 371 (c)(1),
(2), (4) Date: Jan. 4, 2006

(87) PCT Pub. No.: WO2005/002891

PCT Pub. Date: Jan. 13, 2005

(65) Prior Publication Data

US 2006/0250123 A1   Nov. 9, 2006

(30) Foreign Application Priority Data

Jul. 4, 2003   (DE) ................ 103 30 414

(51) Int. Cl.
*G01N 27/00* (2006.01)
*G01L 9/00* (2006.01)
*G01R 19/00* (2006.01)
(52) U.S. Cl. ............. 324/71.1; 324/76.11; 73/753
(58) Field of Classification Search .......... None
See application file for complete search history.

(56) References Cited

U.S. PATENT DOCUMENTS

| | | | | |
|---|---|---|---|---|
| 4,833,921 A | * | 5/1989 | Longo et al. | 73/753 |
| 5,277,485 A | * | 1/1994 | Broome | 303/119.1 |
| 5,496,101 A | * | 3/1996 | Kurokawa et al. | 303/125 |
| 5,502,968 A | * | 4/1996 | Beale | 62/6 |
| 5,825,216 A | * | 10/1998 | Archer et al. | 327/110 |
| 5,951,119 A | * | 9/1999 | Eckert | 303/113.3 |
| 6,213,572 B1 | * | 4/2001 | Linkner, Jr. et al. | 303/155 |
| 6,378,473 B2 | * | 4/2002 | Yamaki et al. | 123/90.11 |
| 6,532,940 B1 | * | 3/2003 | Ono et al. | 123/490 |
| 2001/0004443 A1 | | 6/2001 | Behmenburg et al. | |
| 2002/0136645 A1 | | 9/2002 | Folchert et al. | |

FOREIGN PATENT DOCUMENTS

| | | |
|---|---|---|
| DE | 100 52 663 C | 1/2002 |
| EP | 1 321 320 A | 6/2003 |
| GB | 2 373 223 A | 6/2000 |

\* cited by examiner

*Primary Examiner*—Anjan Deb
*Assistant Examiner*—John Zhu

(57) ABSTRACT

A method used to measure pressure in an area which is closed by an solenoid valve (106) performs the following steps: applying voltage to the solenoid valve (106), determining the peak of a curve of the flowing current based on voltage and determining the pressure based on determination of the peak of the curve.

11 Claims, 11 Drawing Sheets

METHOD FOR MEASURING PRESSURE

BACKGROUND OF THE INVENTION

The present invention relates to a method for measuring a pressure, a digital storage medium for calculating a pressure, and a device for measuring a pressure, in particular for application for motor vehicles.

The measurement of pressure is usually effected by means of pressure sensors. Various sensor principles are known for pressure sensors, for example capacitive or piezoelectric sensor systems. Such pressure sensors are also used for the measurement of pressure in vehicles with air springs and a level regulating system. In this case, the air springs are filled with pressure medium either in an open system or in a closed system.

In an open system, ambient air is drawn in, compressed by a compressor and pumped into the air springs of the vehicle until a desired height level is reached. In order to reduce the level, air is released from the springs to the environment. For repeated introduction of air in the air springs, air is once again drawn in from outside.

In a closed level regulating system, by contrast, pressure medium is not interchanged with the environment. Such closed level regulating systems have been disclosed for example in DE 199 59 556 C1 and EP 1 243 447 A2.

One disadvantage that pressure sensors used for such level regulating systems have in common is that said sensors are relatively unreliable and expensive.

Against this background, the invention is based on the object of providing an improved method for measuring a pressure, in particular for measuring a differential pressure between a gas spring and the supply line thereof. The invention is furthermore based on the object of providing a corresponding computer program product and a device for measuring pressure.

SUMMARY OF THE INVENTION

The invention makes it possible to measure a pressure without a separate pressure sensor. The pressure measurement is effected on the basis of the current flowing when a solenoid valve is opened. In this case, the starting point of the invention is the insight that the current flowing at the peak point of the current rise is characteristic of the differential pressure between the regions separated from one another by the solenoid valve. According to the invention, therefore, the differential pressure is determined on the basis of the determination of said peak point.

According to one preferred embodiment of the invention, the current flowing through the coil of the solenoid valve is measured after the application of the voltage. The peak value is determined from this switching current characteristic. The differential pressure is then determined from the peak value of the current for example by means of a family of characteristic curves or by calculation.

According to a further preferred embodiment of the invention, the coil voltage applied to the solenoid valve is increased step by step by a pulse width modulation ratio being increased step by step. In this embodiment, too, the peak point is once again determined. The pulse width modulation ratio at the peak point determines the average voltage present at the coil of the solenoid valve and is thus correlated with the current and the differential pressure. In this embodiment, then, the differential pressure is determined on the basis of the pulse width modulation ratio at the peak point of the current.

According to a further preferred embodiment of the invention, the temperature dependence of the coil resistance is taken into account in the calculation of the coil current from the pulse width modulation ratio.

According to a further preferred embodiment of the invention, the pulse width modulation ratio at the peak point is referred to a standard voltage. The solenoid valve is calibrated by means of this standard voltage.

Preferred embodiments of the invention are explained in more detail below with reference to the drawings—.

DETAILED DESCRIPTION OF THE DRAWINGS

Figure 1:
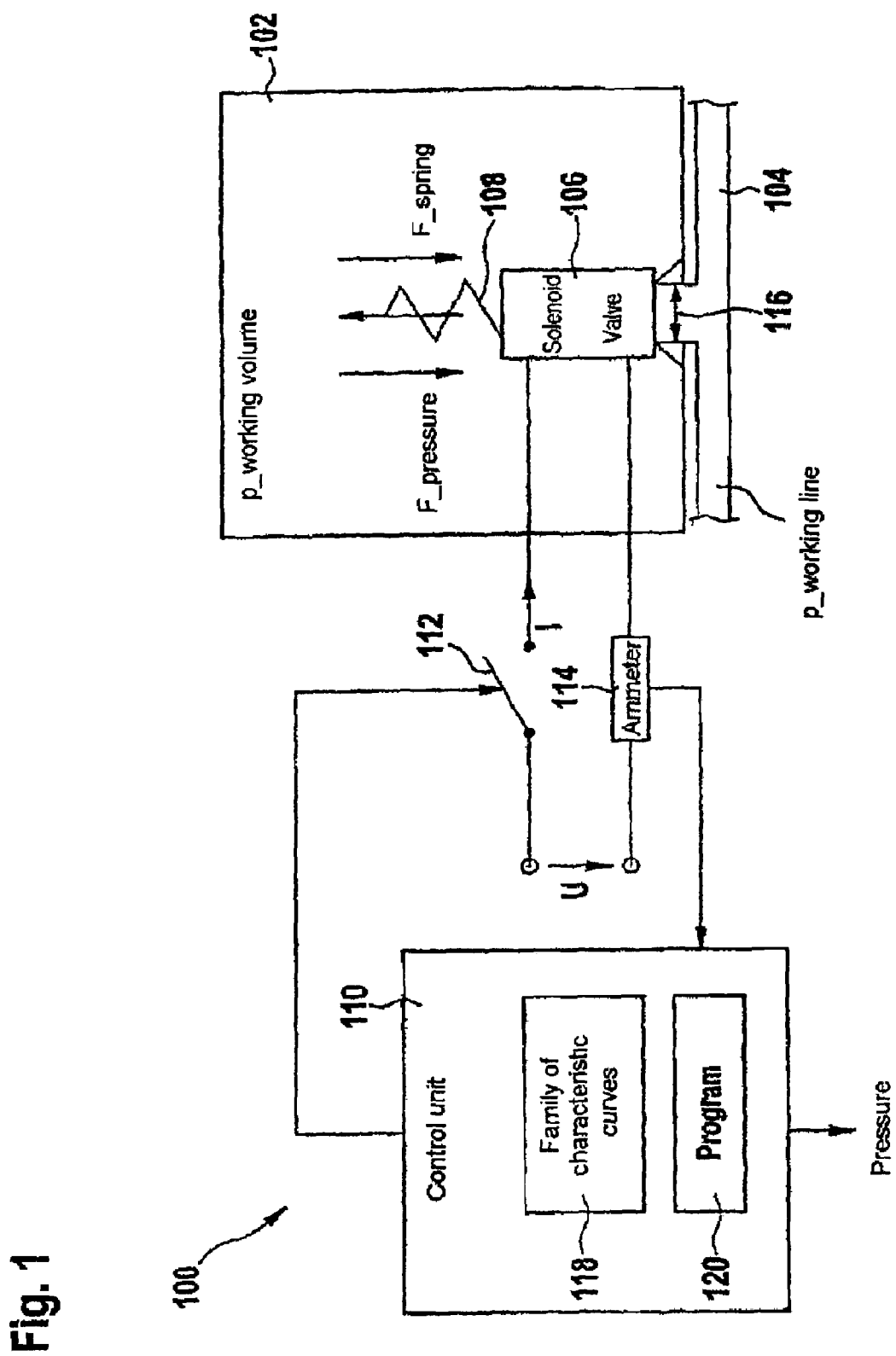
FIG. 1 shows a block diagram of a first embodiment of a device according to the invention for determining differential pressure.

FIG. 1 shows a device 100 for determining pressure. The device 100 is used to measure the pressure difference between the pressure p_working volume prevailing in a working volume of a gas spring 102 and the pressure p_working line prevailing in a working line 104 connected to the gas spring 102. The working line 104 can be connected to the gas spring 102 via a solenoid valve 106.

If no electrical voltage is applied to the solenoid valve 106, the solenoid valve 106 is held in the closed position by a spring 108, which exerts a spring force F_spring on the solenoid valve 106 in the closing direction, and also by the pressure p_working volume prevailing in the working volume of the gas spring 102 with the resulting force F_pressure.

A control unit 110 can close a switch 112 in order to apply a voltage U to the coil of the solenoid valve 106. As a result, a current I flows through the coil. Said current I is measured by an ammeter 114 and input into the control unit 110.

The current I gives rise to an opening force F_magnet of the solenoid valve 106, which is directed oppositely to the forces F_pressure and F_spring.

Shortly before the opening of the solenoid valve 106, that is to say at the instant of the stroke start, the following equilibrium of forces prevails:

$$F\_magnet = F\_pressure + F\_spring,$$

where F_spring is essentially constant and F_pressure is a function of the pressure p_working volume and the valve nominal width 116 of the solenoid valve. At the instant of the stroke start, the current I has its peak value I_switching.

The control unit 110 has a memory 118, in which a family of characteristic curves is stored. Depending on the pressure p_working volume, a different switching current I_switching is associated with each stroke start of the solenoid valve 106 and with each valve nominal width 116. The family of characteristic curves in the memory 118 thus correlates different switching currents I_switching with the corresponding pressures, that is to say p_working volume.

The control unit 110 furthermore has a program 120 stored on a digital storage medium, for example in the main memory of the control unit 110. The program 120 determines the peak point of the current profile from the measured current values supplied by the ammeter 114. The peak value of the current, that is to say I_switching, is used by the program 120 to determine the pressure from the family of characteristic curves stored in the memory 118. If the pressure in the working line p_working line is atmospheric pressure, p_working volume is obtained as relative pressure with respect to the atmosphere. The absolute pressure can be determined therefrom by conversion. If, by contrast, the pressure p_working line lies above the atmospheric pressure, the differential pressure between p_working volume and p_working line is obtained.

Figure 2:
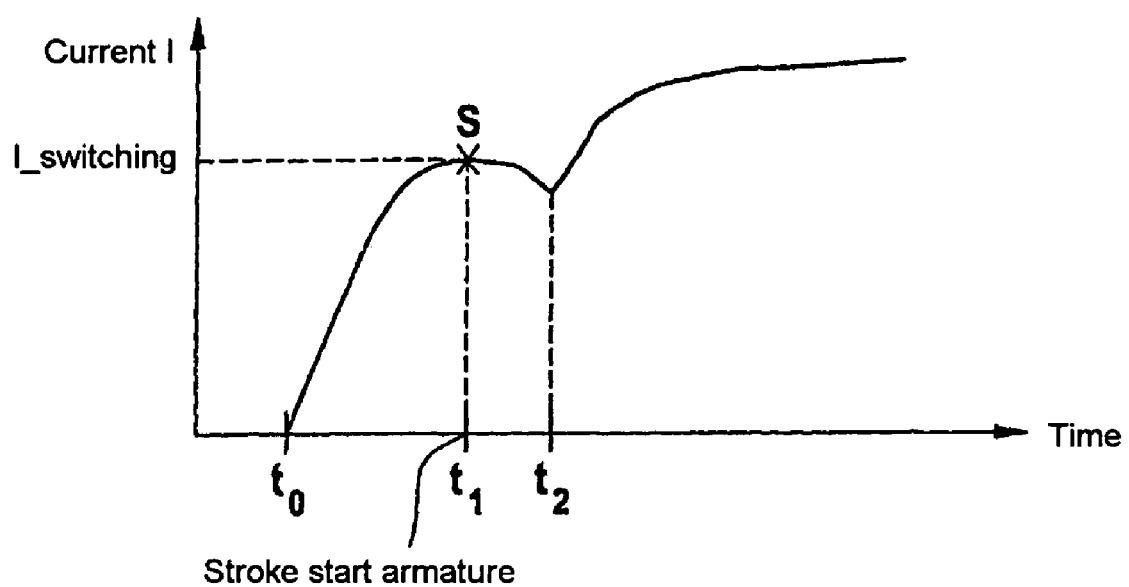
FIG. 2 shows a switching current characteristic of the coil current in the solenoid valve of the device in accordance with FIG. 1.

FIG. 2 shows the corresponding switching current characteristic. At the instant $t_0$, the switch 112 (cf. FIG. 1) is closed, so that the current I starts to flow through the coil of the solenoid valve 106. At the instant $t_1$, the current I reaches a local maximum I_switching at its peak point S.

At the peak point S, an equilibrium between the forces acting on the magnet armature of the solenoid valve 106 prevails shortly before the stroke start. After the instant $t_1$, the magnet armature of the solenoid valve 106 starts to move out of the closed position. On account of the mutual induction thereby generated, the current I decreases until the instant $t_2$, at which the solenoid valve 106 is fully open. After this instant, the mutual induction is discontinued and the current I rises to saturation.

The profile of the current I as shown in FIG. 2 is measured by the ammeter 114 and input into the control unit 110 (cf. FIG. 1), where the peak point S is determined by means of the program 120. The pressure is determined from the switching current I_switching at the peak point S by means of the family of characteristic curves stored in the memory 118.

Figure 3:
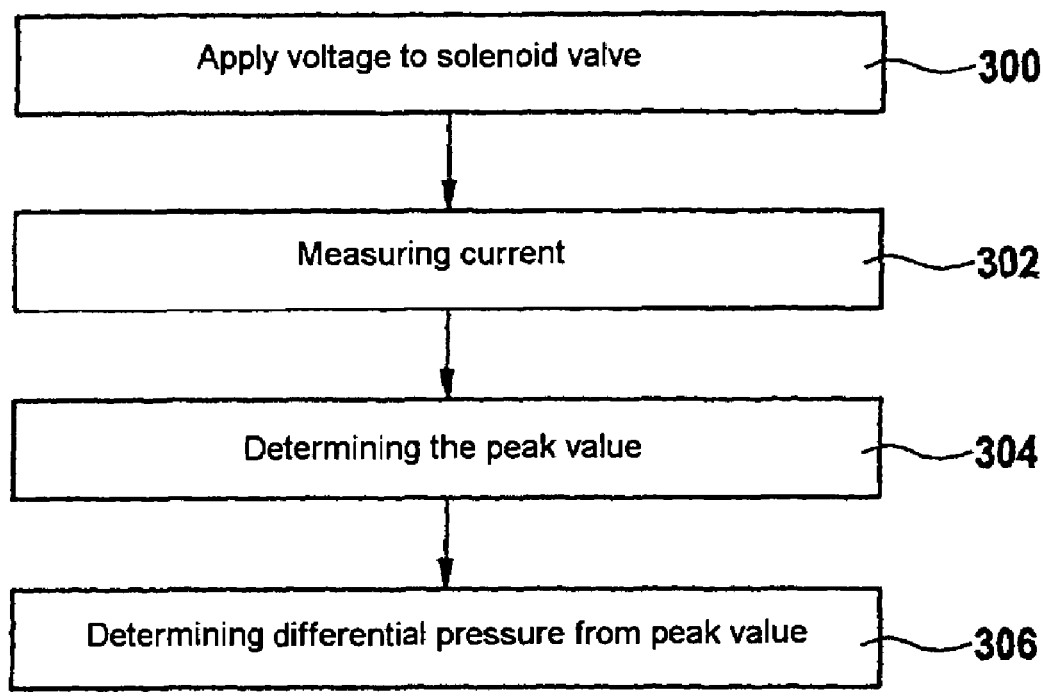
FIG. 3 shows a flowchart for determining the differential pressure with the aid of the device in accordance with FIG. 1.

FIG. 3 shows a corresponding flowchart. In step 300, a voltage is applied to the solenoid valve. The current thereupon flowing through the coil of the solenoid valve is measured in step 302. Step 304 involves determining the peak value of the current at the instant of the stroke start of the magnet armature. This is done for example by determining the first local maximum after the application of the voltage to the solenoid valve in step 300. With the aid of the peak value I_switching, the pressure is determined with the aid of a family of characteristic curves, for example, in step 306.

Figure 4:
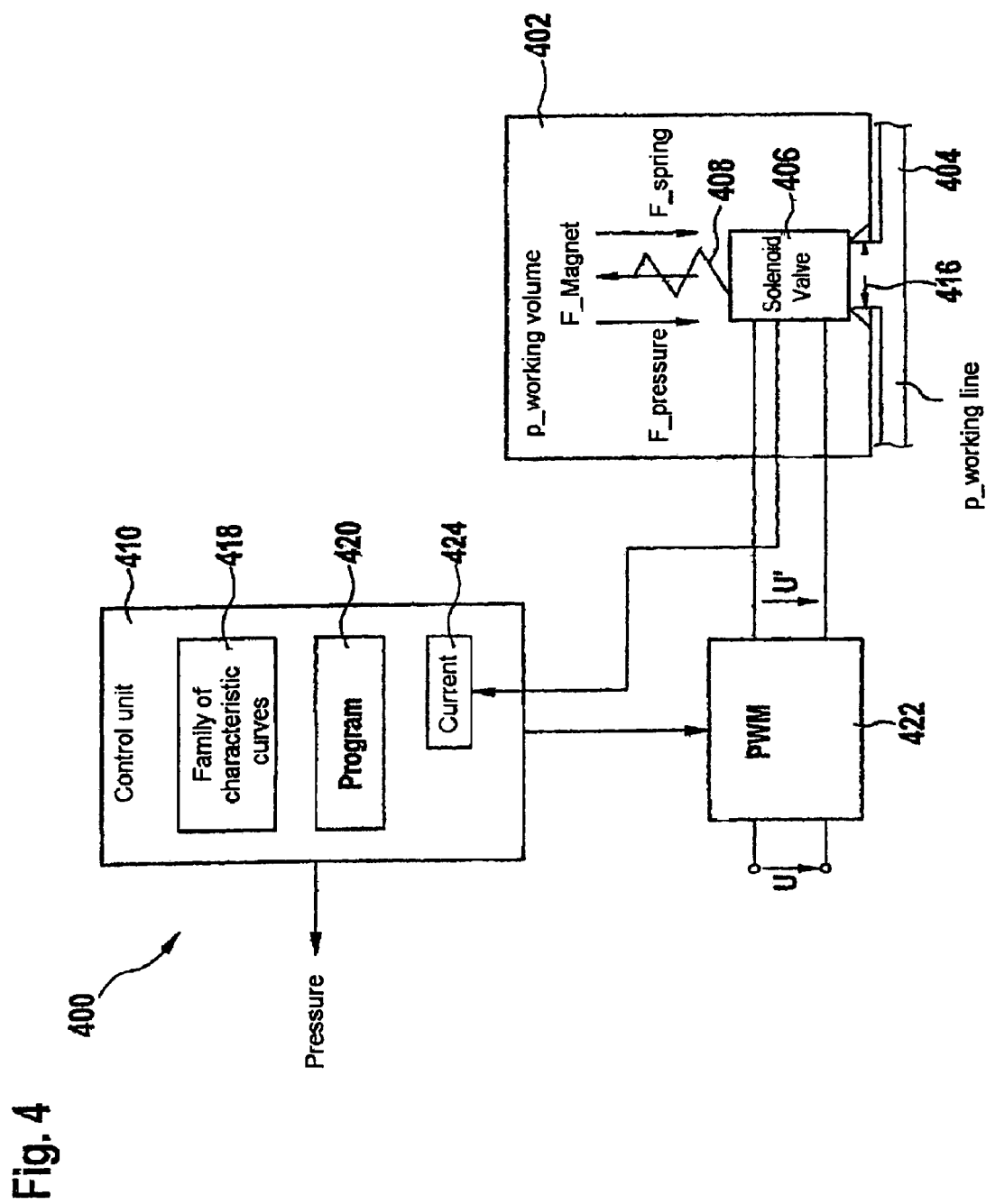
FIG. 4 shows a block diagram of a further preferred embodiment of a device for determining differential pressure.

FIG. 4 shows a further preferred embodiment of a device for measuring pressure. Elements of FIG. 4 which correspond to elements of FIG. 1 are identified by reference symbols increased by 300.

In contrast to the embodiment of FIG. 1, in the case of the embodiment of FIG. 4 the voltage U is not applied directly to the coil of the solenoid valve 406, but rather via a pulse width modulation circuit 422. In the embodiment considered here, the current measurement is effected by a module 424 of an integrated circuit of the control unit 410.

Figure 5:
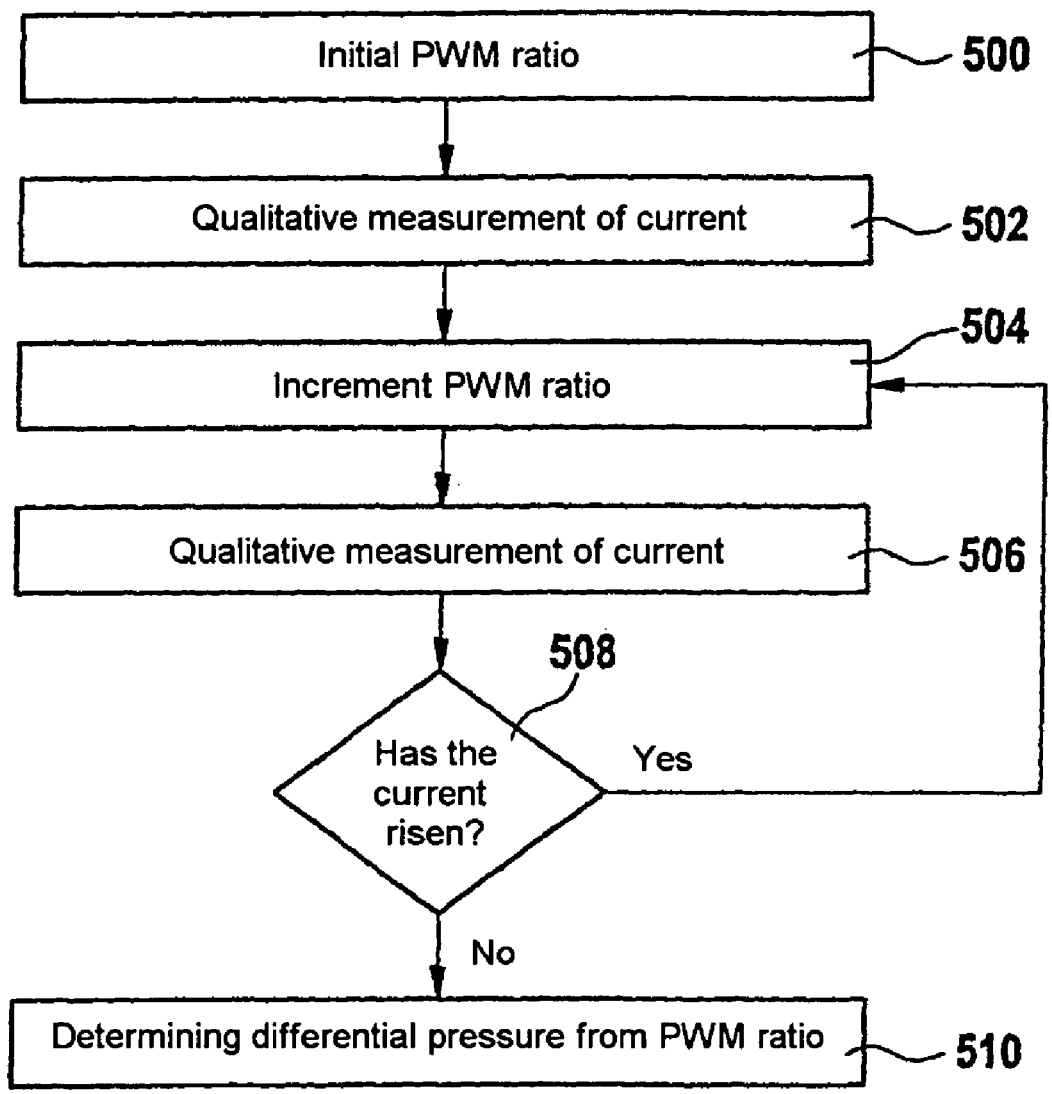
FIG. 5 shows a flowchart for determining the differential pressure with the aid of the device of FIG. 4.

The current measurement may be purely qualitative in this case, that is to say that the absolute magnitude of the measured current value is not important, but rather only whether the current is rising or falling. The measurement accuracy that can be achieved by means of an integrated circuit is sufficient for such a qualitative measurement. The operation of the device 400 is explained in more detail with reference to the flowchart of FIG. 5.

In step 500, the program 420 of the control unit 410 starts the measurement sequence by outputting an initial pulse width modulation ratio of close to 0 as a control signal to the pulse width modulation circuit 422. At the output of the pulse width modulation circuit 422, therefore, the relatively low voltage U' that results from the pulse-width-modulated voltage U is applied to the coil of the solenoid valve 406. The resulting coil current is measured qualitatively by the module 424 and input into the program 420. This is done in step 502.

In step 504, the program 420 increases the pulse width modulation ratio by outputting a corresponding control signal to the pulse width modulation circuit 422. The current resulting on account of the increase in the pulse width modulation ratio is again measured qualitatively by the module 424, in step 506.

In step 508, the program 420 checks whether the current has risen in comparison with the preceding current measurement. If this is the case, the program sequence of the program 420 returns to step 504 in order to increment the pulse width modulation ratio again.

If the opposite is the case, this means that the peak point of the current profile has been reached with the present pulse width modulation ratio and, in step 510, the pressure is determined on this basis from the family of characteristic curves 418 or by calculation by the control unit 410.

Figure 6:
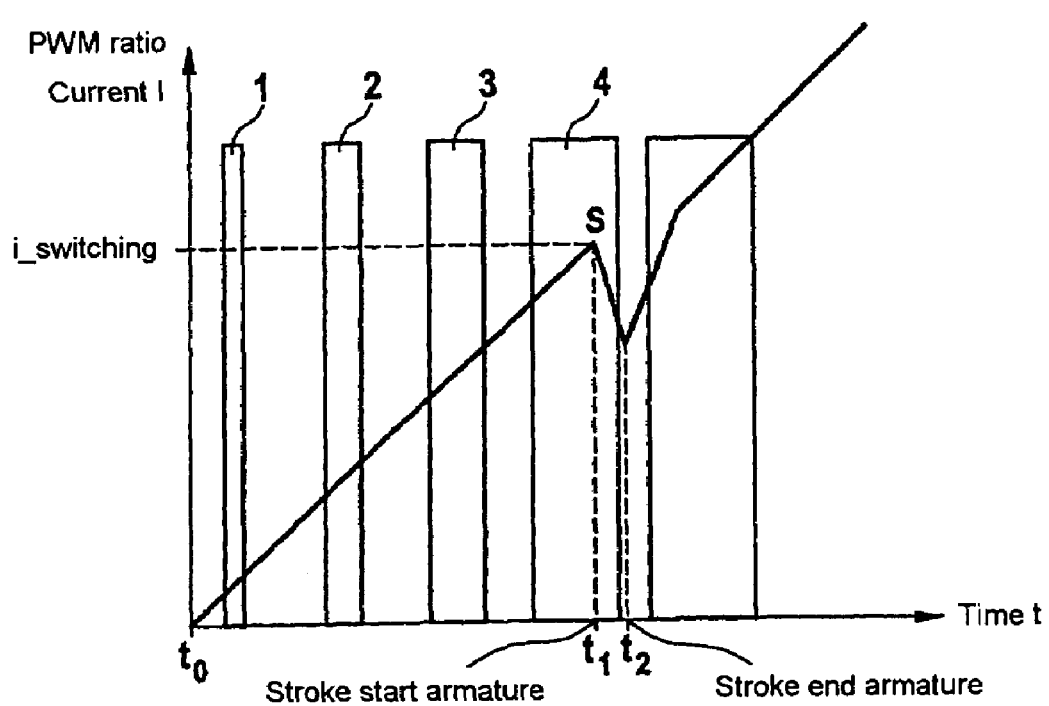
FIG. 6 shows the switching current characteristic of the coil current in the embodiment in accordance with FIG. 4 in the case of the pulse width modulation ratio being increased step by step.

The diagram of FIG. 6 shows the corresponding current profile in relation to the pulse width modulation (PWM) ratios. Starting from the start instant $t_0$ of the measurement sequence, the PWM ratio is in this case increased in steps 1, 2, 3 and 4, the current I being measured qualitatively. At the instant $t_1$ it is established that the current I has reached its peak value I_switching. The PWM ratio at said instant $t_1$ is in this case correlated with the pressure by means of the voltage U' present at the coil of the solenoid valve 406 and the current I_switching that flows on account of the coil resistance. By means of a corresponding family of characteristic curves, therefore, given a constant voltage U, the pressure can be determined solely from the PWM ratio.

If the voltage U is not constant, as may be the case for instance with the on-board voltage of motor vehicles, it is necessary to calculate the coil current I_switching from the PWM ratio at the peak point S. This calculation is effected from the coil resistance according to Ohm's law. In order to increase the accuracy, it is possible in this case to concomitantly take account of the temperature dependence of the coil resistance. An exemplary embodiment of a corresponding procedure is explained in more detail below with reference to FIGS. 7 to 11.

Figure 7:
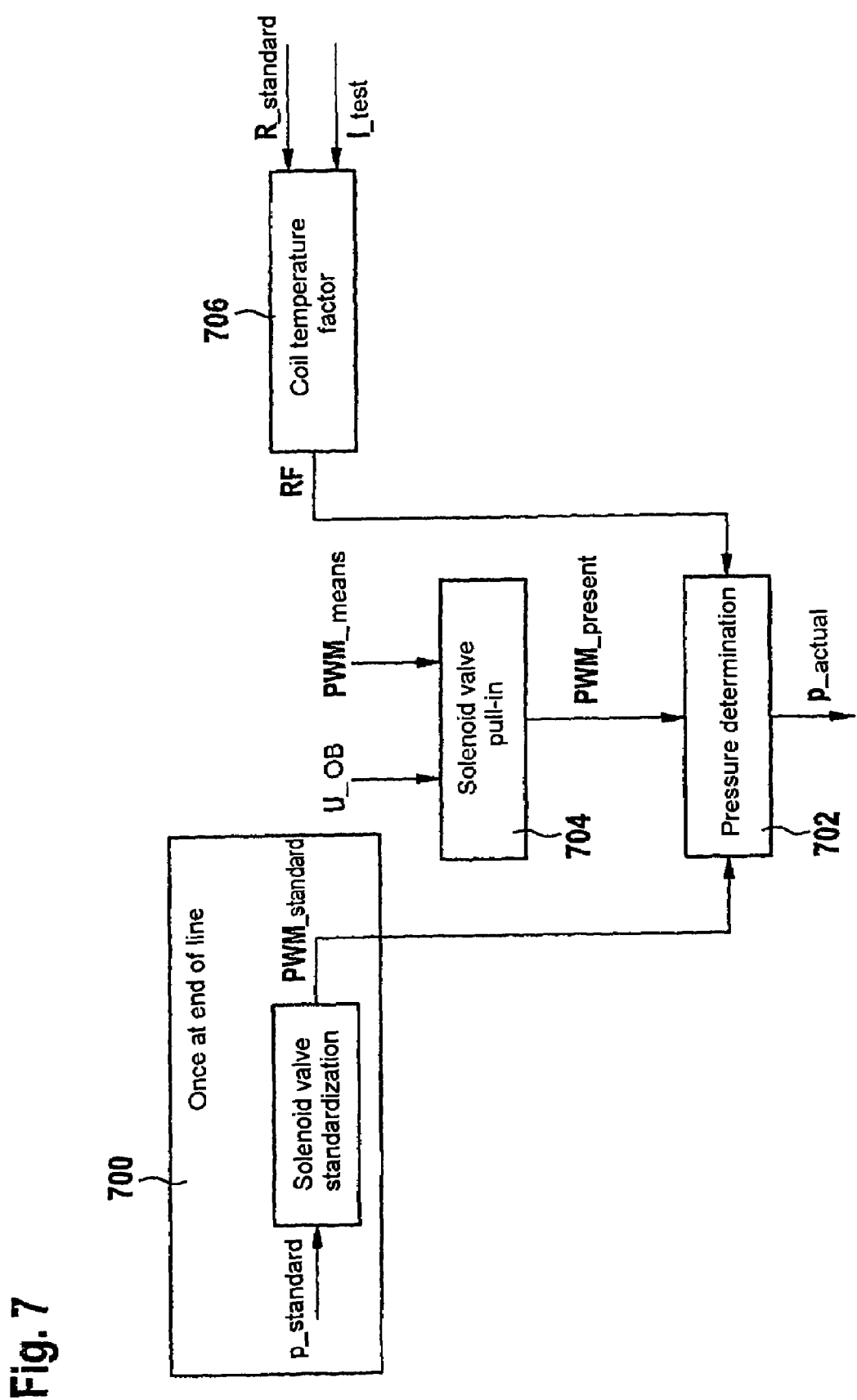
FIG. 7 shows a flowchart of a further preferred embodiment with solenoid valve calibration and with account being taken of the coil temperature for determining the differential pressure.

FIG. 7 shows a flowchart for determining pressure taking account of calibration of the solenoid valve and the coil temperature. Step 700 involves effecting calibration of the solenoid valve (cf. solenoid valve 106 of FIG. 1 and solenoid valve 406 of FIG. 4). During the calibration, a standard pressure p_standard of e.g. 10 bar prevails in the gas spring (cf. gas spring 102 of FIG. 1 and gas spring 402 of FIG. 4), to be precise at a standard temperature of e.g. T=20° and a standard voltage U_standard of e.g. 6 volts.

The PWM ratio PWM_standard at which the switching current I_switching flows is determined for the calibration of the solenoid valve. Said value PWM_standard is incorporated in the pressure determination in step 702. The value PWM_standard is determined for example only once after the production of the motor vehicle at the end of the line and is then stored in the control unit.

The pressure determination in step 702 firstly requires the determination of the PWM ratio PWM_meas at the peak point S of the current curve. Said value PWM_meas and also the on-board voltage U_OB are converted into the value PWM_present in step 704, said value PWM_present being used for the pressure determination in step 702.

In step 706, a coil temperature factor RF is determined from a standard resistance R_standard and a test current I_test. The coil temperature factor RF is likewise taken into account during the pressure determination in step 702 for determining the pressure p_present.

Figure 8:
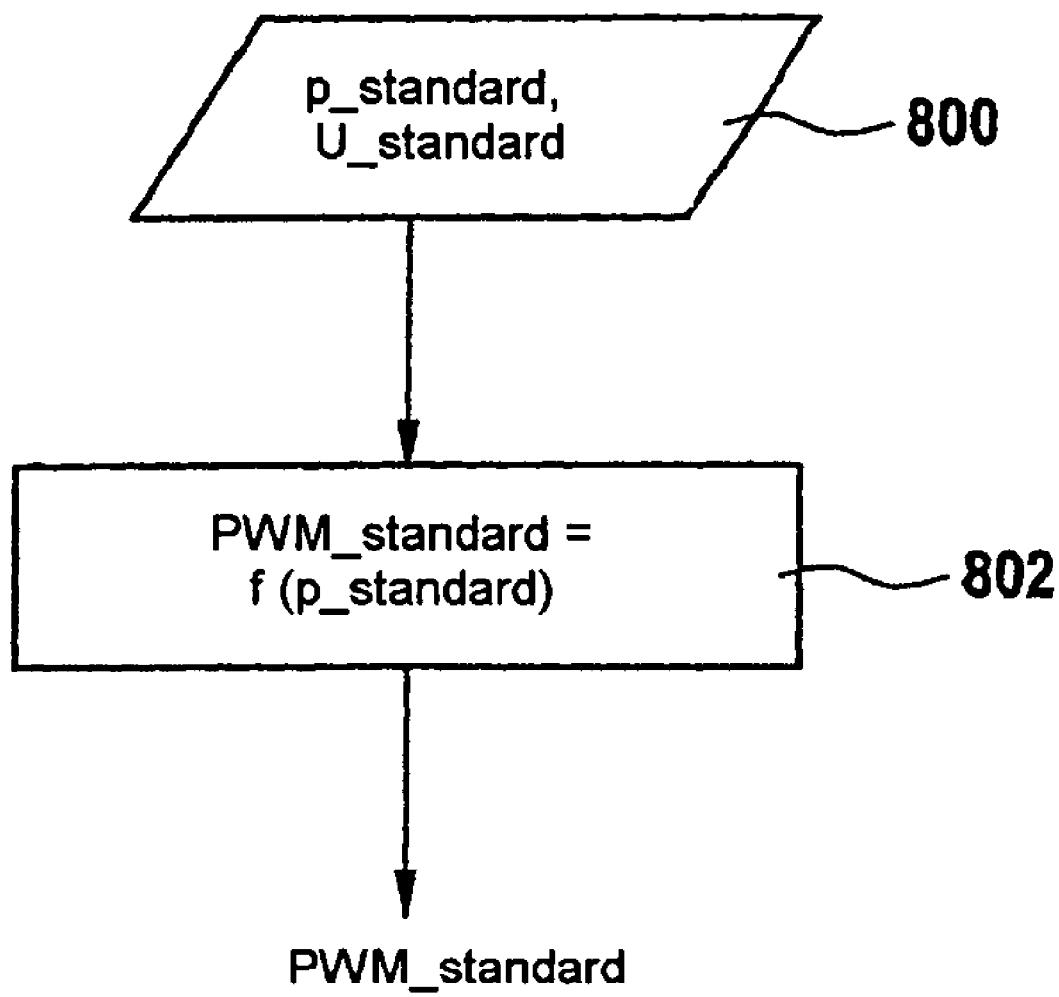
FIG. 8 shows a flowchart for solenoid valve calibration.

FIG. 8 shows the procedure for determining PWM_standard in step 700. In step 800, the standard pressure p_standard is set externally at the end of the line. The standard voltage U_standard is furthermore applied. Step 802 involves determining the PWM ratio PWM_standard at the peak point S of the current profile under these standard conditions, the value PWM_standard being a function of p_standard and also the geometrical and material tolerances.

Figure 9:
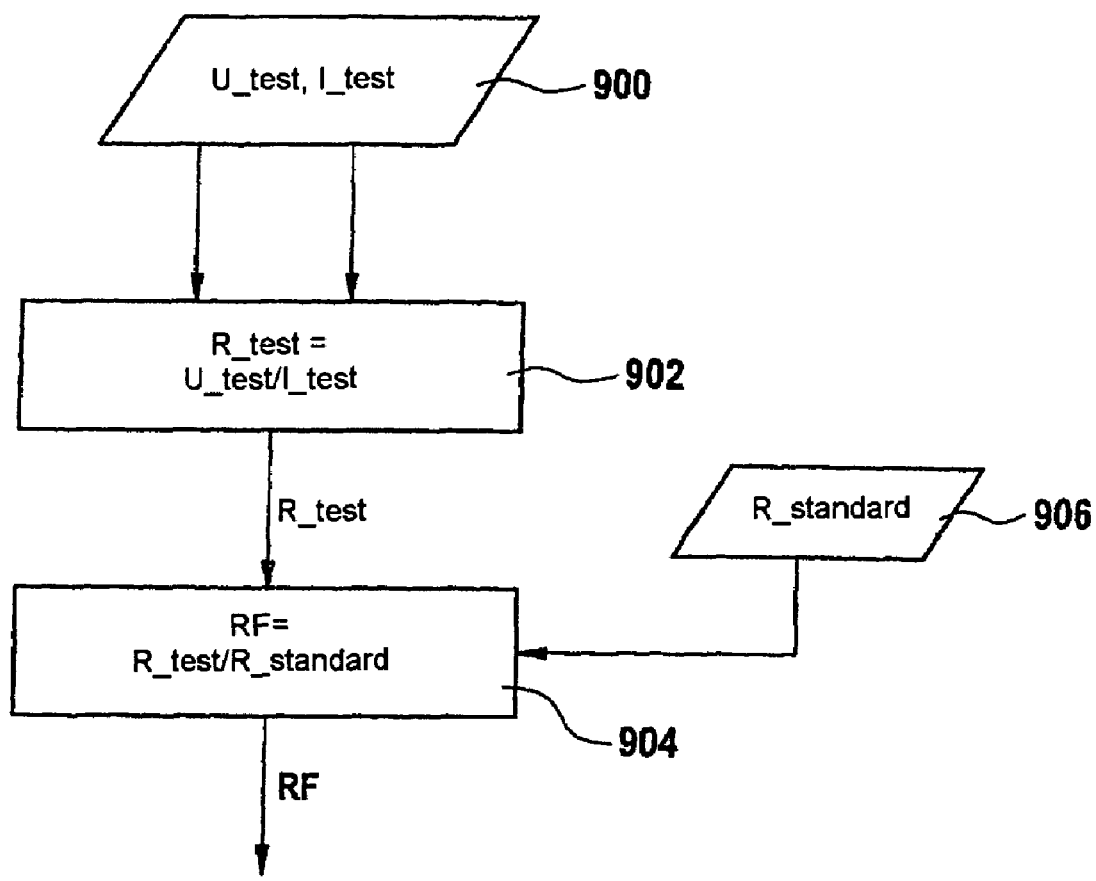
FIG. 9 shows a flowchart for determining a coil temperature factor.

FIG. 9 illustrates the procedure in step 706 for determining the coil temperature factor RF. In step 900, a specific current I_test is generated in the coil of the solenoid valve through corresponding setting of the pulse width modulation ratio. From the on-board voltage U_OB, the voltage U_test results from this PWM ratio, said voltage U_test being present at the coil. In step 902, the coil resistance R_test is calculated therefrom according to Ohm's law.

In step 904, the resistance R_test is referred to a standard resistance R_standard, which results in the coil temperature factor RF. In step 906, the standard resistance R_standard is determined preferably during the calibration in step 700 and is stored in the control unit.

Figure 10:
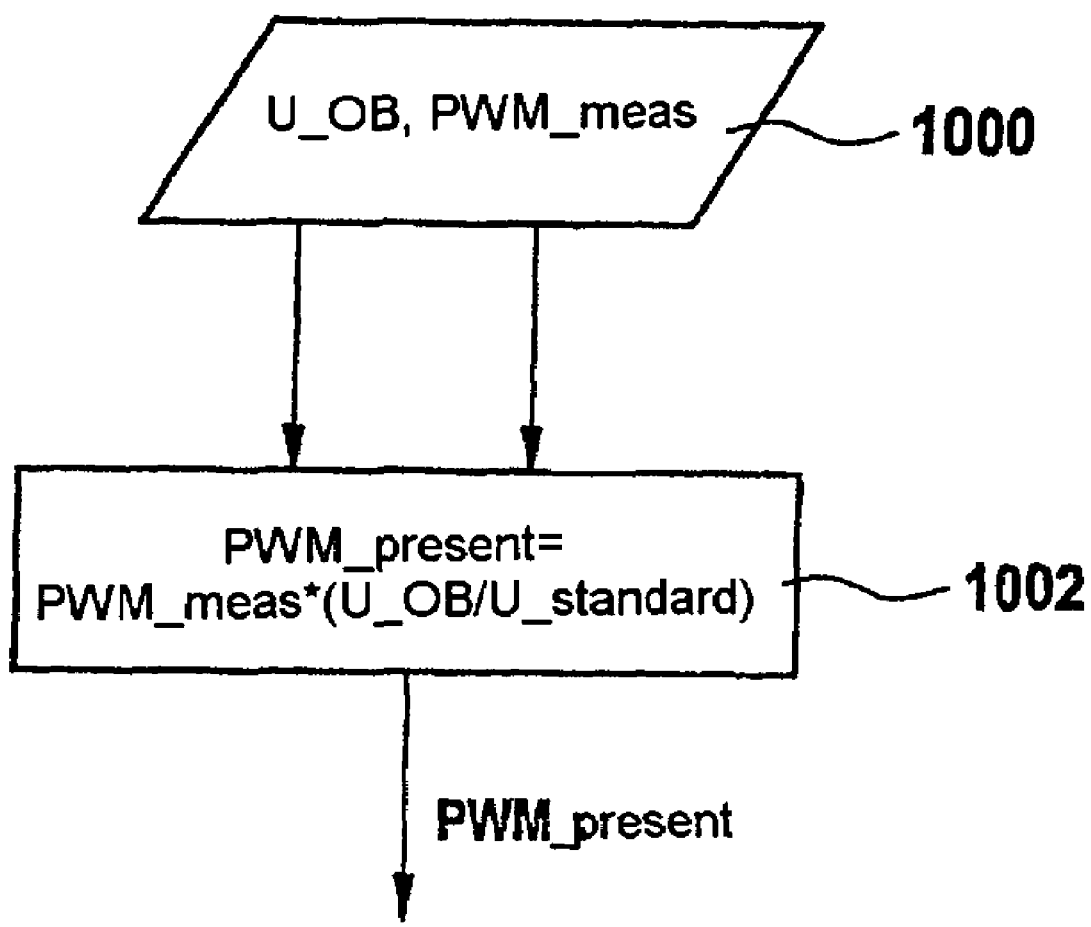
FIG. 10 shows a flowchart for determining a pulse width modulation ratio referred to a standard voltage.

FIG. 10 shows the procedure for determining PWM_present in step 704. For this purpose, step 1000 involves inputting the on-board voltage U_OB and also the PWM ratio PWM_meas at the peak point S. In step 1002 the value PWM_present is calculated therefrom by multiplying PWM_meas by the ratio of U_OB and U_standard.

Figure 11:
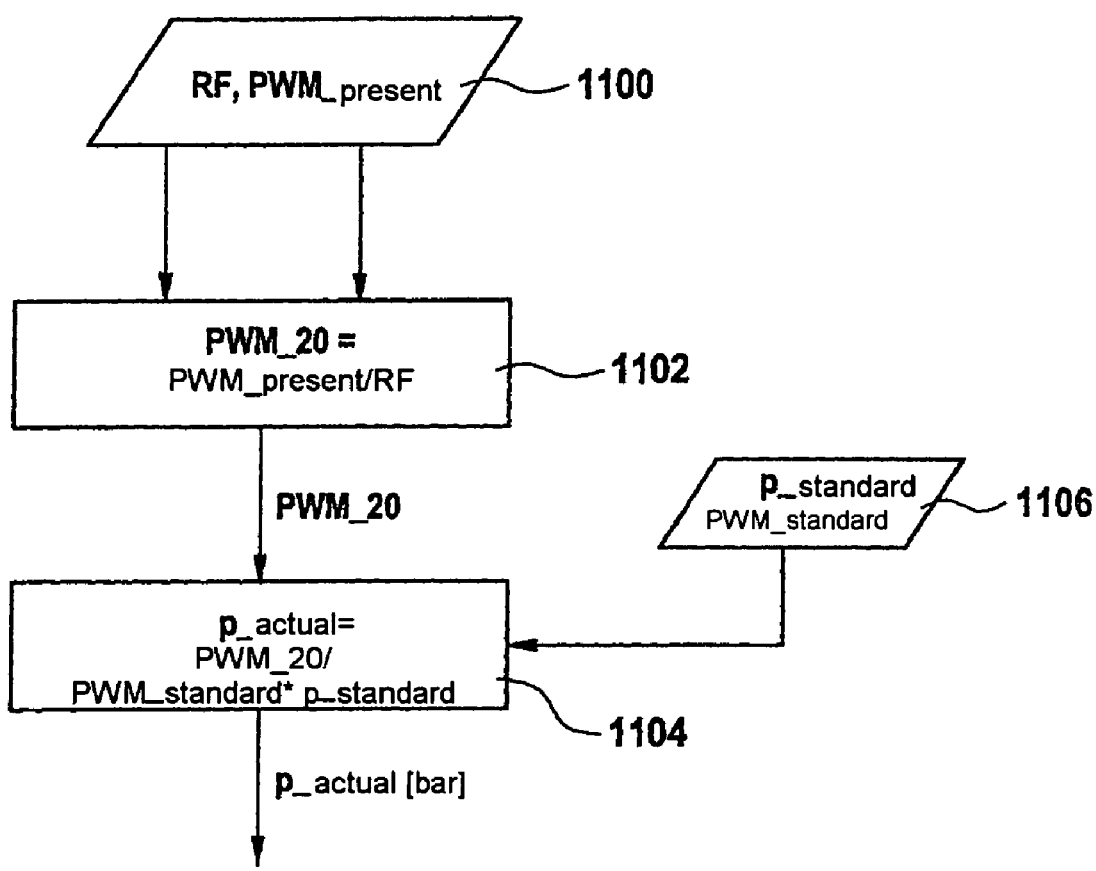
FIG. 11 shows a flowchart for determining the differential pressure from the coil temperature factor and the pulse width modulation ratio referred to the standard voltage.

FIG. 11 shows the procedure for determining pressure in step 702. For this purpose, step 1100 involves inputting the coil temperature factor RF and the value PWM_present. In step 1102, the PWM ratio at standard temperature, that is to say in this example T=20°, PWM__20 is calculated therefrom by dividing PWM_present by RF.

In step 1104, the pressure p_actual is calculated from the value PWM__20. For this purpose, step 1106 involves inputting the standard pressure p_standard and the value PWM_standard determined by calibration. The calculation is effected by dividing PWM__20 by PWM_standard and multiplying by P_standard.

LIST OF REFERENCE SYMBOLS

100 Device
102 Gas spring
104 Working line
106 Solenoid valve
108 Spring
110 Control unit
112 Switch
114 Ammeter
116 Valve nominal width
118 Memory
120 Program
400 Device
402 Gas spring
404 Working line
406 Solenoid valve
408 Spring
410 Control unit
416 Valve nominal width
418 Memory
420 Program
422 Pulse width modulation circuit
424 Module

The invention claimed is:

1. A method for measuring a pressure in a region which is closed off by a solenoid valve, having the following steps of:
    applying a voltage to the solenoid valve,
    determining a peak point of the current flowing on account of the voltage representing a switching current at which the valve switches to an open position,
    determining the pressure based on the determination of the peak point, and
    generating output information representative of the pressure,
    wherein the pressure is determined by means of a family of characteristic curves.

2. The method as claimed in claim 1,
    further including the steps of measuring the peak value of the current at the peak point, and
    determining the pressure on the basis of the peak value.

3. The method as claimed in claim 1,
    wherein the region is a working volume of a gas spring.

4. A method for measuring a pressure in a region which is closed off by a solenoid valve, having the following steps of:
    applying a voltage to the solenoid valve.
    determining a peak point of the current flowing on account of the voltage representing a switching current at which the valve switches to an open position,
    determining the pressure based on the determination of the peak point , and
    generating output information representative of the pressure,
    wherein the voltage is increased step by step by increasing a pulse width modulation ratio step by step, and wherein the pressure is determined on the basis of the pulse width modulation ratio at the peak point.

5. The method as claimed in claim 4,
    wherein the pressure is determined by calculation.

6. The method as claimed in claim 4,
    wherein the peak value of the current is determined from the pulse width modulation ratio at the peak point and a coil resistance of the solenoid valve, and wherein the pressure in determined on the basis of the peak value.

7. The method as claimed in claim 6,
wherein a temperature dependence of the coil resistance of the solenoid valve is taken Into account for determining the pressure on the basis of the peak value of the current.

8. The method as claimed in claim 4,
wherein the pulse width modulation ratio at the peak point is referred to a standard voltage.

9. The method as claimed in claim 8,
wherein the solenoid valve is calibrated by means of the standard voltage.

10. A device for determining a pressure in a region which is closed off by a solenoid valve (106; 406), having a control unit (110; 410) for applying a voltage to the solenoid valve, wherein the control unit is capable of determining a peak point (S) of the current (I) flowing on account of the voltage by increasing step by step a pulse width modulation ratio of the voltage applied to the solenoid valve and of determining the pressure on the basis of the pulse width modulation ratio at the peak point.

11. The device as claimed in claim 10,
wherein the control unit is further capable of (114; 420, 424) determining the peak value (I_switching) of the current at the peak point (S) and to determine the pressure on the basis of the peak value.

* * * * *